United States Patent [19]

Sakoh et al.

[11] Patent Number: 4,796,024

[45] Date of Patent: Jan. 3, 1989

[54] SELECTIVE CALLING RECEIVER WITH AUTOMATIC MEMORY STORAGE AND TURN-ON INDICATION

[75] Inventors: Kazushige Sakoh, Urawa; Hiroshi Arakawa, Yokohama; Hiroyuki Yamaguchi, Hamura; Tatsuaki Sekigawa, Hachiougi; Toshiyasu Takasugi, Hadano; Shinjiro Umetsu, Kawasaki; Takehiko Tsutsumi, Funabashi, all of Japan

[73] Assignee: Nippon Telegraph and Telephone Corporation (et al.), Tokyo, Japan

[21] Appl. No.: 824,169

[22] Filed: Jan. 30, 1986

[30] Foreign Application Priority Data

Jan. 31, 1985 [JP] Japan ................................ 60-16849

[51] Int. Cl.[4] .......................... G08B 7/06; H04Q 7/00

[52] U.S. Cl. ............................ 340/825.44; 340/311.1; 455/31

[58] Field of Search ...................... 340/825.44, 825.48, 340/825.57, 825.69, 825.71, 825.72, 825.73, 825.20, 825.36, 825.37, 311.1; 455/31, 38, 53, 343; 379/56, 57

[56] References Cited

U.S. PATENT DOCUMENTS

| | | | |
|---|---|---|---|
| 4,010,460 | 3/1977 | DeRosa | 340/825.48 |
| 4,010,461 | 3/1977 | Stodolski | 340/825.48 |
| 4,145,684 | 3/1979 | Stodolski | 340/825.48 |
| 4,392,135 | 7/1983 | Ohyagi | 340/825.44 |
| 4,419,668 | 12/1983 | Ganucheau, Jr. | 340/825.44 |
| 4,462,030 | 7/1984 | Ishii | 340/825.44 |

FOREIGN PATENT DOCUMENTS

| | | | |
|---|---|---|---|
| 2116342 | 9/1983 | United Kingdom | 340/825.44 |
| 2136179 | 9/1984 | United Kingdom | 340/311.1 |
| 2146153 | 4/1985 | United Kingdom | 340/825.44 |

*Primary Examiner*—John W. Caldwell, Sr

*Assistant Examiner*—Edwin C. Holloway III

*Attorney, Agent, or Firm*—A. Thomas S. Safford

[57] ABSTRACT

A selective calling receiver with automatic memory storage and turn-on indication is disclosed. When the receiver is placed in the called state by an incoming signal, audible and/or visual indicator signals actuated by the incoming signal are automatically stopped after a predetermined period of time has elapsed and record of the called state is simultaneously kept in a memory integral to the receiver. Indication of the called state is regenerable at a later time by a switching operation. Indication of the called state is stoppable without recording such indication in memory when a manual reset operation is performed before indication of the called state is automatically stopped.

3 Claims, 3 Drawing Sheets

SELECTIVE CALLING RECEIVER WITH AUTOMATIC MEMORY STORAGE AND TURN-ON INDICATION

BACKGROUND OF THE INVENTION

1. Field of the Invention

This invention relates to a selective calling receiver, such as a paging receiver, and more particularly to a selective calling receiver with automatic memory storage and turn-on indication features which give the unit improved efficiency of operation and a greater range of flexibility of use. The improvements in the unit are of such a nature that indication of incoming calls, hereinafter referred to as "indication of the called state", or simply "the called state", is automatically stopped and regenerated.

2. Related Art Statement

In a receiver having a selective calling function, such as a paging receiver, generally, when an incoming call is received by the unit, such an occurrence is made known to the user by some audible or visible attention-getting means, such as by the generation of an alarm sound, the activation of a light source, such as a light-emitting lamp or light-emitting diode, or by some similar means designed to draw the user's attention to the fact that there is an incoming call. On most units, the user can turn-off the audible or visible indication signal by activating a reset switch.

In the situation where the user intends to manually turn-off such indication signal, but where the user cannot respond instantly thereto, such as where the user is otherwise occupied or is some distance from the calling receiver or is away from that location, the indication signal may continue for a long period of time when the receiver is in the called state, which may cause other persons in the vicinity of the receiver to become annoyed by its continued signalling. Moreover, where the receiver is battery-powered, such continued signalling is a drain on the battery.

In order to overcome the aforesaid disadvantages of conventional calling receivers, it has heretofore been proposed to incorporate in such units a device having a so-called automatic reset function which automatically stops indication of the called state after a certain period of time.

In situations where the indication signal is an audible alarm, at such times when it is desired to avoid sounding of the alarm, for example, such as during an interview or a conference, the automatic reset function enables temporary stopping of the indication signal alarm, with provision that indication of the called state is recorded in a memory storage device, from which it can later be determined that the receiver has been in the called state by activation of a switch or the like to display the contents of the memory storage device.

In conventional selective calling receivers, however, the automatic reset and memory functions are usually added to the recalling receiver at a later time, with such functions operating independently of one another, so that it is necessary for the user to switch from one or the other of either the reset or memory functions during use.

More specifically, an automatic reset function acts in accordance with an indication signal such as a sounding alarm or an activated steady or flashing light source, while a memory function acts without any accompanying indication signal. Thus, in the situation where the user is away from the site where the calling receiver is located when an indication signal is produced due to an incoming call, the user is later unaware of the fact that there was an incoming call unless the calling receiver has been switched to memory mode before the user leaves the area. This lack of flexibility of such a unit is a considerable disadvantage. Where the calling receiver is a portable unit, the alternative of the user always carrying around the receiver with him can be equally disadvantageous.

OBJECT OF THE INVENTION

Accordingly, an object of the present invention is to provide a selective calling receiver of improved efficiency and greater flexibility of function by providing the unit with correlated automatic reset and memory features.

SUMMARY OF THE INVENTION

The selective calling receiver of the present invention, capable of attaining the above object, comprises a means, operating simultaneously, for automatically stopping a sounding alarm or activated light source indication signal after a certain period of time when the receiver is in the called state; a means for recording the indication of such called state in a built-in memory storage means for later retrieval of the indication of the called state by a switching operation from the reset function to the memory function; and a means for stopping indication of the called state without recording such indication in the memory in situations where the reset function is manually activated to stop the indication signal before the automatic reset function is triggered.

BRIEF DESCRIPTION OF THE DRAWINGS

Embodiments of the invention will now be described, by way of examples, with reference to the accompanying drawings, in which.

DETAILED DESCRIPTION OF PREFERRED EMBODIMENTS

Preferred embodiments of the present invention are described hereinbelow in accordance with the drawings.

Figure 1:
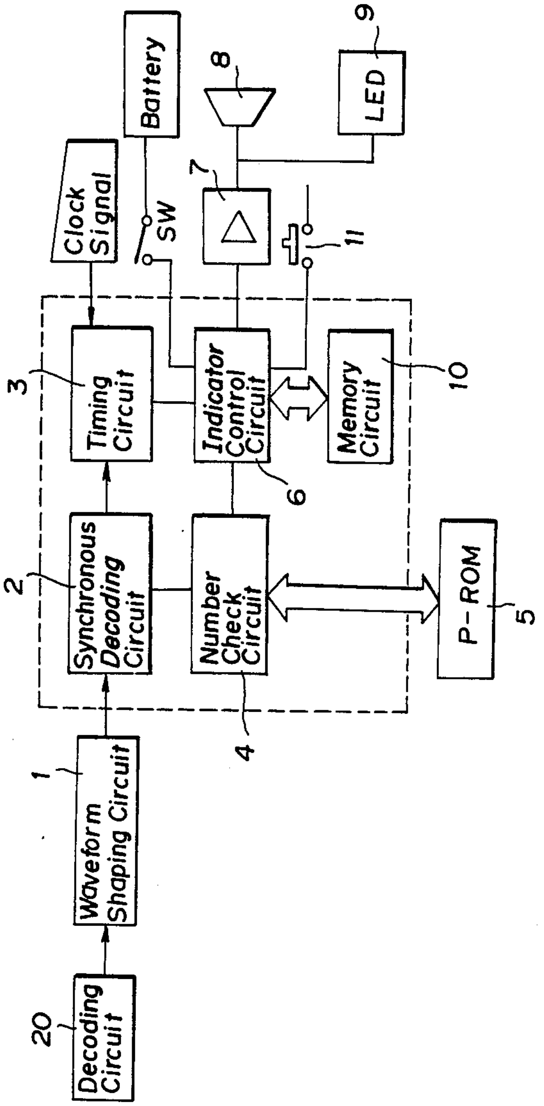
FIG. 1 is a block diagram illustrating an embodiment of the decoder circuit of the selective calling receiver according to the present invention.

Referring now to the block diagram of FIG. 1 which illustrates an embodiment of a decoder section of the selective calling receiver of the present invention, waveform-shaping circuit 1 shapes a selective call signal output from a decoding circuit 20 of the receiver and thereafter inputs the shaped signal to a synchronous decoding circuit 2. Synchronous decoding circuit 2 separates the selective call signal into a synchronizing signal and a call signal and inputs the separated signals to a timing circuit 3 and a number-check circuit 4, respectively. In the number-check circuit 4, the call signal is collated with a local call code stored in a programmed read-only memory (P-ROM) 5, and when the signals coincide, an indicator control circuit 6 is actuated and produces an output which is sent to amplifier 7 and then to speaker 8 and light-emitting diode 9, thereby generating both an audible and visible indication signal.

Timing circuit 3 generates a timing pulse required for synchronizing the indicator control circuit with the synchronizing signal from the synchronous decoding circuit 2. Timing circuit 3 is also provided with a timer for automatically stopping operation of the indicator control circuit 6 after a predetermined period of time has elapsed. The indicator control circuit 6 also has a memory circuit 10 and a reset switch 11. Thus, the selective call receiver with the decoder is capable of operating such that actuation of the reset switch 11 during operation of the indicator control circuit causes an immediate stop of the indicator signal, however, when operation of the indicator signal is automatically stopped by the timer of timing circuit 3 without actuation of the reset switch, memory circuit 10 is actuated to store an indication of the called state, which can be later retrieved by actuation of the reset switch causing the indicator control circuit 6 to be reactivated and to emit an audible and/or visible signal.

Figure 2:
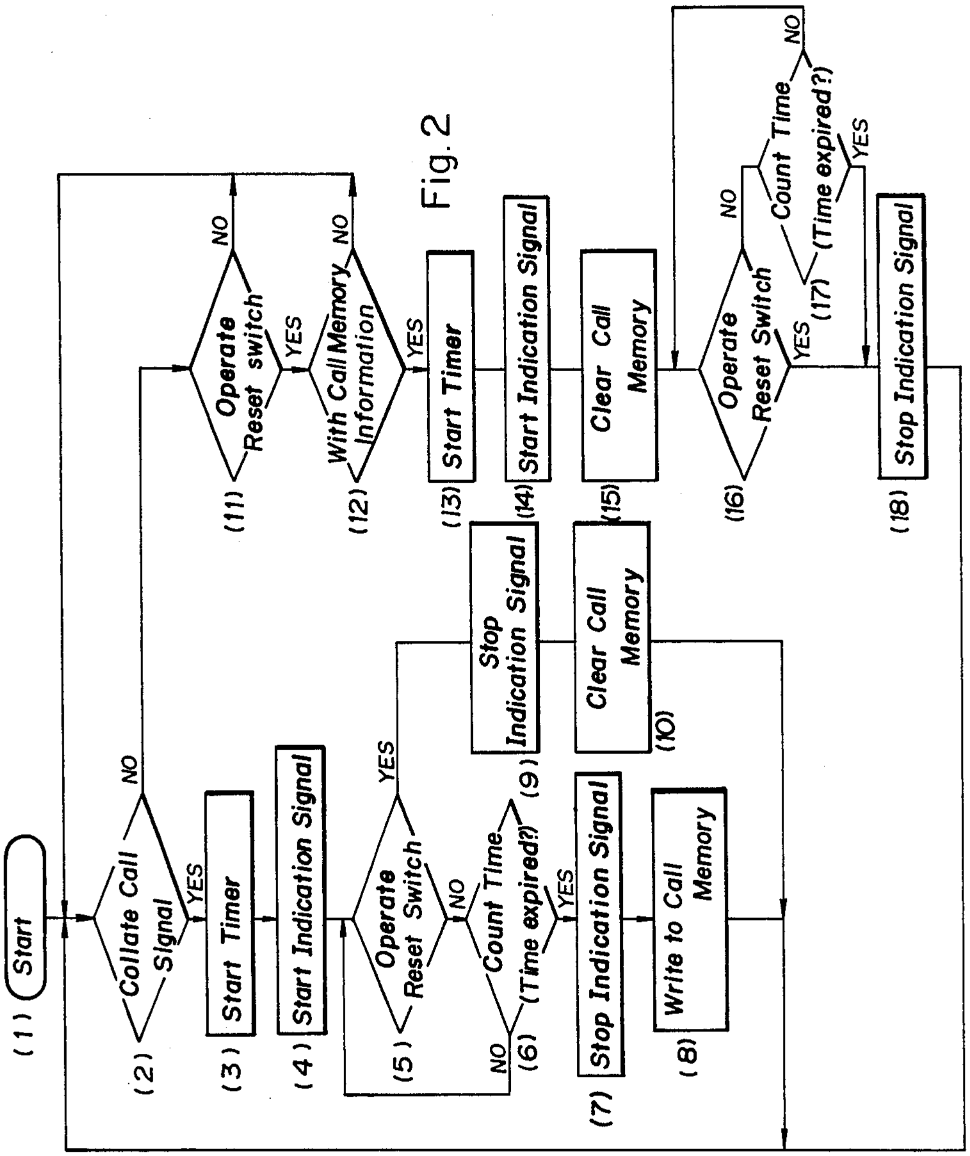
FIG. 2 is a flow chart of the sequence of steps for a typical operating example of the selective calling receiver provided with the decoder circuit illustrated in FIG. 1.

Referring now to FIG. 2, the functions and operation of the selective call receiver equipped with the decoder, as described above, will now be described in detail.

The flow chart of FIG. 2 shows the operating procedure of a receiver having a single call number. The operating procedure commences with a series of steps in which an incoming call to the receiver is processed.

After the selective call receiver has been switched-on (1), an incoming call signal is collated with a local call signal stored in P-ROM 5 (2), so that when both signals coincide, the timer in the timing circuit 3 is activated (3), and an audible and/or visible indication signal is then generated (4).

The generation of aniindication signal indicating that the receiver is in the called state continues until the timer of timing circuit 3 counts a predetermined period of time, e.g. 30 seconds (6), but when the reset switch 11 is actuated by the pushing of a button or such similar act, within the predetermined period of time (5), indication of the called state is immediately terminated (9) and memory circuit 10 is simultaneously cleared (10). Thus, any record of previous indication of the called state is erased in the case of manual operation of the reset switch. If, however, the reset switch 11 is not actuated while the timer of timing circuit 3 measures the predetermined period of time, indication of the called state stops automatically (7), and at the same time, record of indication of the called state is stored in memory circuit 10 (8), thereby completing a sequence of operations which returns the receiver to the call signal collating state, that is, the waiting state, wherein the receiver is ready to receive a incoming call signal.

When the reset switch 11 is actuated while the receiver is in the waiting state (11), an indicator signal is generated (14), while the timer circuit is activated (13) and the indicator signal is then automatically stopped and memory circuit 10 cleared of information regarding previous indication of the call state stored in the memory (15), simultaneous with the automatic stopping of the indicator signal, as in the case of the called state.

When the reset switch is manually operated during activation of the indicator signal, the indicator signal, audible and/or visible, is instantly stopped and the memory circuit is cleared (17, 18).

While the foregoing case description has been for the situation where there is only a single call signal, it is to be understood that the present invention is not limited thereto. Indicator signals in response to multiple call signals can be programmed and memory circuits corresponding to a number of such incoming call signals can be added to the receiver to accommodate the situation where a plurality of call signals are assigned to that receiver.

In such a case, the functions and operation of the unit are essentially as shown for the single call signal case just described and illustrated in FIG. 2, with operation for the multiple call signal case being different only in that the multiple call signals are serially processed by the various stages of the receiver shown for the single call signal case.

Figure 1A:
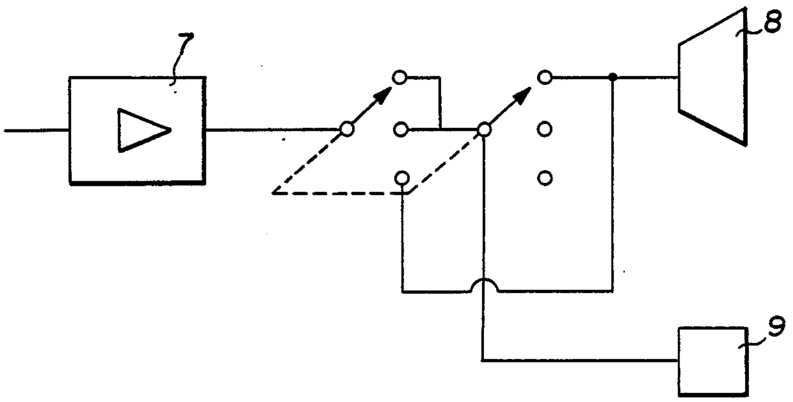
FIG. 1A is a schematic illustration of a switch arrangement in the embodiment of FIG. 1.

Although the embodiments of the present invention have been described for the situation wherein both an audible and a visible indication signal are produced concurrently when the receiver is placed in the called state, such as by an alarm sounding and activation of a light source, such as a light-emitting diode, indication of the called state may alternatively be effected by only one or another of the two means by the use of an alternation switch, as illustrated in FIG. 1A, for example. When incorporating such a modification, indication of the called state may be shown, for example, only by activation of a light source, such as a light-emitting diode, unaccompanied by generation of an audible alarm sound. The use of an alternation switch is particularly desirable in situations where generation of an audible indication signal would be disruptive, such as in a conference.

The automatic stop function of the present invention for terminating the indication signal after the receiver has been placed in the called state, may also be utilized to terminate an indicator signal which has been activated by turning on the power source switch of the receiver, as a method of checking operation of the receiver, although it is not then actually in the called state. In this situation, conditions are set such that no record is made in the memory circuit at the time the iniicator signal is automatically stopped.

Another situation which may occur is where there is a defect in the system which causes contact between the built-in battery and the electrode terminals to be temporarily separated, such as due to vibration of the receiver, so that a similar situation to that of turning on the power source to the receiver occurs, wherein an indicator signal is erroneously caused to be given, even though the receiver is not in the called state. In such a situation, it is desirable for the user to be able to ascertain the actual cause for activation of the indicator signal and to be able to distinguish between actual incoming calls or other extraneous signals. This is accomplished in the present invention by the provision of a modification to the timing circuit 3, whereby the timer is programmed to count different durations of time before the reset function is activated to automatically stop the indicator signal, depending on the cause of generation of the indicator signal. Thus, the timer counts out different durations of time before the timing circuit 3 causes activation of the reset function for the condition of the receiver being placed in the called state on one hand, and for the condition of either a test signal upon the turning on of the receiver or an extraneous signal due to a disruption in the power supply to the receiver.

The foregoing description of preferred embodiments of the invention are not intended to be limiting, and it will occur to those of ordinary skill in the art that other embodiments and modifications thereto, within the scope of this invention, as set forth in the specification and appended claims, are possible.

We claim:

1. A selective calling receiver with automatic memory storage and turn-on indication comprising:

a decoding circuit for receiving an incoming indication signal of the receiver being in a called state and analyzing said signal to ascertain that the incoming call is intended for that receiver;

a waveform shaping circuit which receives a signal output from said decoding circuit as an incoming signal and reshapes the incoming signal to a waveform recognizable by a synchronous decoding circuit;

a synchronous decoding circuit which receives the reshaped signal from the waveform shaping circuit and separates the signal into a synchronizing signal and a call signal for input, respectively, to a timing circuit and a number check circuit;

a timing circuit, which receives said synchronizing signal separated by the synchronous decoding circuit, and generates a timing pulse required for synchronizing an indicator control circuit with the synchronizing signal from the synchronous decoding circuit;

a timer, which is part of said timing circuit, for automatically stopping operation of the indicator control circuit after a predetermined period of time has elapsed;

a number check circuit for collating said call signal with a local code stored in a programmed read-only memory;

an indicator control circuit, which is connected to said number check circuit and is actuated when said call signal and said local call code coincide, and which produces an output which is sent to an amplifier;

an amplifier which amplifies the output signal from said indicator control circuit and sends said amplifier signal to both audible and visual indication devices thereby generating both an audible and a visible indication signal, respectively:

a memory circuit as part of the indicator control circuit for storing an indication of the called state;

a reset switch connected to said indicator control circuit for manually causing a stop of the indication signal before said indication signal is automatically stopped by said timer of said timer circuit after said predetermined time has elapsed;

a power source for energizing the selective calling receiver; and said timer being programmed to count two periods of time, whereby a first period of time is counted when said power source of the receiver is turned on, before the indication signal that the receiver has been energized is turned off and a second period of time, differrent from said first period of time, is counted when there is an indication of the called state, which indication of the called state is stored in memory.

2. The selective calling receiver of claim 1 wherein the audible indication device is a speaker and the visible indication device is a light emitting diode.

3. The selective calling receiver of claim 1 wherein the audible indication device and the visible indication device are independently actuatable.

* * * * *